US012685692B1

(12) United States Patent
Zhao et al.

(10) Patent No.: US 12,685,692 B1
(45) Date of Patent: Jul. 21, 2026

(54) UNIVERSAL RECIPROCATING MULTI-STAGE ADJUSTABLE MASSAGER

(71) Applicants: Dongguan Yishuo Electronic Technology Co., Ltd., Dongguan (CN); Beston (Shenzhen) Technology Co., Ltd., Shenzhen (CN)

(72) Inventors: Quan Zhao, Dongguan (CN); Zhenbo Zhang, Shenzhen (CN)

(*) Notice: Subject to any disclaimer, the term of this patent is extended or adjusted under 35 U.S.C. 154(b) by 0 days.

(21) Appl. No.: 19/429,344

(22) Filed: Dec. 22, 2025

(30) Foreign Application Priority Data

Dec. 8, 2025 (CN) ........................ 202522598366.X
Dec. 8, 2025 (CN) ........................ 202522598602.8

(51) Int. Cl.
*A61H 23/02* (2006.01)

(52) U.S. Cl.
CPC . *A61H 23/0254* (2013.01); *A61H 2201/0192* (2013.01); *A61H 2201/14* (2013.01); *A61H 2201/1454* (2013.01); *A61H 2201/1669* (2013.01)

(58) Field of Classification Search
CPC ............ A61H 23/0254; A61H 23/0263; A61H 19/00–50; A61H 2201/192; A61H 2201/14; A61H 2201/1454; A61H 2201/1669; A61H 21/00
See application file for complete search history.

(56) References Cited

U.S. PATENT DOCUMENTS 6,902,525 B1 * 6/2005 Jewell .................... A61H 19/44 600/38
10,940,076 B2 * 3/2021 Haddock ............ A61H 15/0085
11,833,102 B1 * 12/2023 Liu ........................ A61H 19/44
11,835,114 B1 * 12/2023 Leng ....................... F16H 25/12
2009/0099413 A1 * 4/2009 Kobashikawa ........ A61H 19/44 600/38
2016/0354277 A1 * 12/2016 Fima ...................... A61H 19/44
2019/0350800 A1 * 11/2019 Sloan ..................... A61H 19/32
2022/0168177 A1 * 6/2022 Vierheller ............ A61H 23/006
2024/0358588 A1 * 10/2024 Liu ........................ A61H 19/44
2024/0390222 A1 * 11/2024 Lei ..................... A61H 23/0263
2025/0017814 A1 * 1/2025 Li .......................... A61H 19/44
2025/0032348 A1 * 1/2025 Li .......................... A61H 7/007
2025/0161146 A1 * 5/2025 Yan ........................ A61H 7/005

* cited by examiner

*Primary Examiner* — Joseph D. Boecker
*Assistant Examiner* — Thomas W Greig

(57) ABSTRACT

A universal reciprocating multi-stage adjustable massager includes an outer coating, a power mechanism is installed inside the outer coating; the power mechanism includes: a fixing base, a rod base, and a fixed steel shaft; the fixing base is fixedly connected to the rod base through the fixed steel shaft; a drive assembly, including a power motor, and the power motor is fixedly connected to a bottom side of the rod base; a reciprocating lead screw, wherein a drive end of the power motor is fixedly connected to a bottom side of the reciprocating lead screw, and a top end of the reciprocating lead screw is rotatably connected to an interior of the fixing base; the invention uses the cooperation between the Hall encoder and the pole pair magnetic rings to collect the rotation pulse signal of the power motor in real time.

10 Claims, 5 Drawing Sheets

UNIVERSAL RECIPROCATING MULTI-STAGE ADJUSTABLE MASSAGER

TECHNICAL FIELD

The invention relates to the technical field of massagers, and specifically to a universal reciprocating multi-stage adjustable massager.

BACKGROUND ART

A massager is a device that stimulates human muscles and acupoints through physical means such as vibration, kneading, and pressing to relieve fatigue and relax the body and mind. It achieves massage functions through an integrated body. Its core lies in directly acting on human muscles or acupoints by means of physical methods like mechanical vibration, kneading, or pressing to relieve soreness, promote blood circulation, and relax the body and mind. Common types include hand-held massage sticks, shoulder and neck patch-type massagers, and waist-fixed massage cushions. They are characterized by simple operation and high portability, can be used directly without assembly, and are suitable for precise local massage or daily relaxation at any time.

However, in the prior art, some massagers cannot switch the intensity according to the degree of muscle soreness during use. If the intensity is too light, there is no effect; if it is too heavy, it is easy to cause discomfort or even muscle damage. Moreover, these massagers are difficult to fit parts with different curves, resulting in uneven massage coverage, and some local areas cannot be effectively stimulated. Therefore, in view of the above shortcomings, a universal reciprocating multi-stage adjustable massager is proposed.

SUMMARY OF THE INVENTION

Aiming at the deficiencies of the prior art, the invention provides a universal reciprocating multi-stage adjustable massager, which solves the problem that some massagers cannot be adjusted according to needs.

To achieve the above purpose, the invention is realized through the following technical solutions: a universal reciprocating multi-stage adjustable massager, includes an outer coating, a power mechanism is installed inside the outer coating;

- a drive assembly, including a power motor, and the power motor is used to provide a driving source;
- the drive assembly further includes a Hall encoder and a first pole pair magnetic ring, a bottom of the power motor is installed on a top side of the Hall encoder.

Preferably, the power mechanism also includes:

- a fixing base, a rod base, and a fixed steel shaft; the fixing base is fixedly connected to the rod base through the fixed steel shaft;
- the power motor is fixedly connected to a bottom side of the rod base;
- a bottom side of the Hall encoder is mounted on a top side of the first pole pair magnetic ring;
- a reciprocating lead screw, wherein a drive end of the power motor is fixedly connected to a bottom side of the reciprocating lead screw, and a top end of the reciprocating lead screw is rotatably connected to an interior of the fixing base;
- and a reciprocating slider, wherein the reciprocating slider is threadedly connected to an exterior of the reciprocating lead screw, and an interior of the reciprocating slider is slidably connected to an exterior of the fixed steel shaft.

Preferably, a vibration motor is fixedly connected to the interior of the reciprocating slider.

Preferably, the power mechanism further includes a slider steel shaft and a steel shaft fixing part; the slider steel shaft is arranged parallel to the fixed steel shaft, penetrates the reciprocating slider, and has both ends clamped in the steel shaft fixing part; a bottom end of the reciprocating lead screw rotates inside the rod base under the drive of the power motor.

Preferably, the power mechanism further includes:

- a bracket, an exterior of the bracket is fixedly connected to an interior of the outer coating;
- a bevel gear, wherein the drive end of the power motor is in meshed connection with the bevel gear;
- a main drive shaft, wherein the bevel gear is fixedly connected to an exterior of the main drive shaft;
- a first synchronous pulley, wherein the first synchronous pulley is arranged on the exterior of the main drive shaft;
- ball slide rails, wherein the ball slide rails are fixedly connected to both front and rear sides of the bracket;
- and a three-directional ball slider, wherein the three-directional ball slider is slidably connected to interior of the ball slide rails, and the three-directional ball slider is drivingly connected to the first synchronous pulley through a timing belt.

Preferably, the drive assembly further includes a Hall encoder and a first pole pair magnetic ring; a right protective cover and a left protective cover are fixedly connected to a bottom of the bracket; an exterior of the power motor is mounted inside the bracket and the right protective cover.

Preferably, a second pole pair magnetic ring is mounted at a bottom of the three-directional ball slider; a Hall zero switch is mounted inside the bracket; a second synchronous pulley is mounted on a right side of the first synchronous pulley; a reinforced steel shaft is fixedly connected to an interior of the main drive shaft.

Preferably, an idler reinforced steel shaft is rotatably connected to an interior of the bracket; a first synchronous idler is fixedly connected to an exterior of the idler reinforced steel shaft; a second synchronous idler is fixedly connected to a right side of the first synchronous idler.

Preferably, a timing belt tensioning slider is detachably connected to a left interior of the three-directional ball slider; a timing belt tensioning slide rod is arranged inside the timing belt tensioning slider.

Preferably, a timing belt tensioning nut is threadedly connected to an exterior of the timing belt tensioning slide rod; follow-up clamps are fixedly connected to both front and rear sides of interior of the three-directional ball slider.

The invention provides a universal reciprocating multi-stage adjustable massager, which has the following beneficial effects:

1. the invention uses the cooperation between the Hall encoder and the pole pair magnetic rings to collect the rotation pulse signal of the power motor in real time. At the same time, it determines the initial zero position of the massage component through a zero-return switch or a finely adjustable Hall zero switch, laying an accurate benchmark for multi-stage adjustment. This improves the adaptability to massage needs and enhances the massage effect;

2. the invention accurately determines the initial position through the second pole pair magnetic ring and the finely adjustable Hall zero switch, and realizes multi-gear positioning in combination with the Hall encoder, meeting the usage requirements of the male masturbator. The engineering plastic bracket integrates installation functions, adapts to the internal space of the male masturbator, and improves structural compactness. In addition, the rubber pad design of the follow-up clamp can protect the timing belt, ensuring long-term stable operation.

BRIEF DESCRIPTION OF ACCOMPANY DRAWINGS

Wherein,

1. outer coating;

2. power mechanism; 211. drive assembly; 21101. power motor; 21102. Hall encoder; 21103. first pole pair magnetic ring;

212. rod base; 213. slider steel shaft; 214. fixed steel shaft; 215. fixing base; 216. reciprocating lead screw; 217. reciprocating slider; 218. vibration motor; 219. steel shaft fixing part;

221. bracket; 222. right protective cover; 223. left protective cover; 224. ball slide rail; 225. three-directional ball slider; 226. second pole pair magnetic ring; 227. Hall zero switch; 228. first synchronous pulley; 229. second synchronous pulley; 2210. main drive shaft; 2211. bevel gear; 2212. reinforced steel shaft; 2213. timing belt tensioning slider; 2214. timing belt tensioning slide rod; 2215. timing belt tensioning nut; 2216. idler reinforced steel shaft; 2217. first synchronous idler; 2218. second synchronous idler; 2219. follow-up clamp.

SPECIFIC EMBODIMENT OF THE INVENTION

The following will clearly and completely describe the technical solutions in the embodiments of the invention with reference to the accompanying drawings in the description of the invention. Obviously, the described embodiments are only part of the embodiments of the invention, not all of them. Based on the embodiments of the invention, all other embodiments obtained by those of ordinary skill in the art without creative work shall fall within the protection scope of the invention.

Embodiment 1

Figure 1:
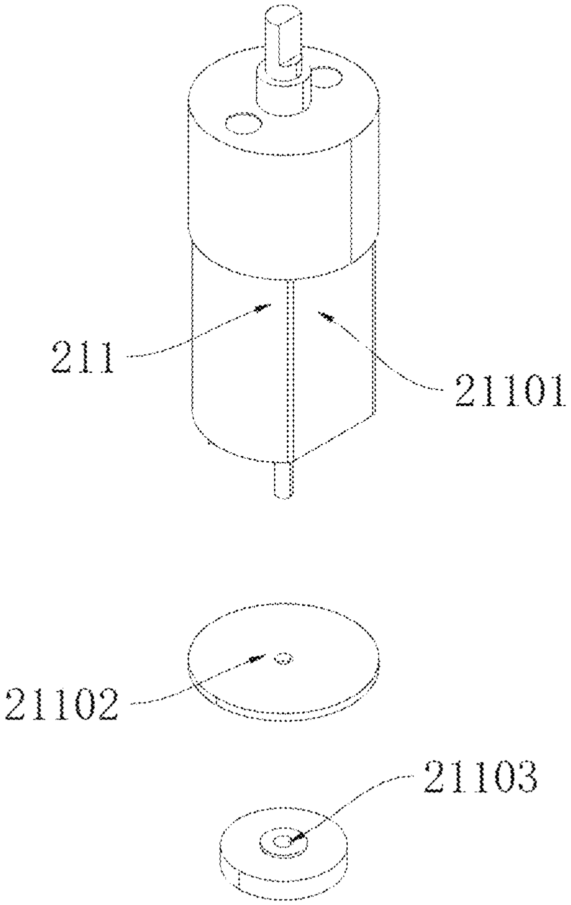
FIG. 1 is a schematic diagram of the Hall encoder in Embodiment 1 of the invention.
Figure 2:
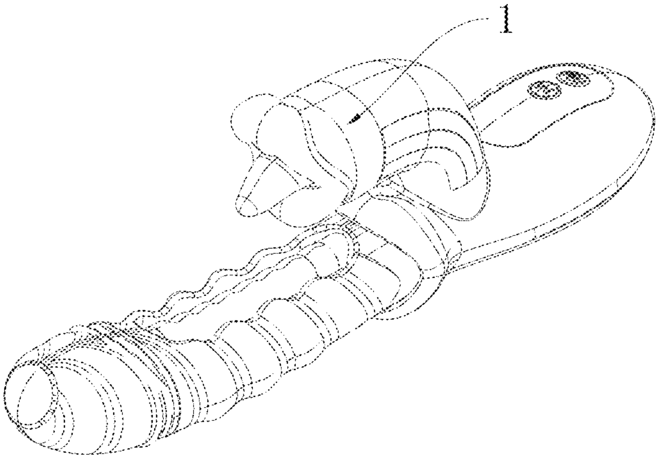
FIG. 2 is a three-dimensional view of Embodiment 2 of the invention.
Figure 3:
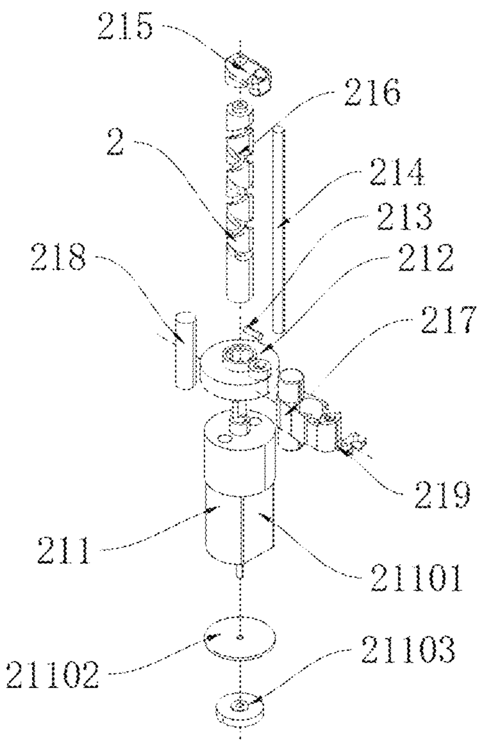
FIG. 3 is a schematic diagram of the reciprocating slider in Embodiment 2 of the invention.
Figure 4:
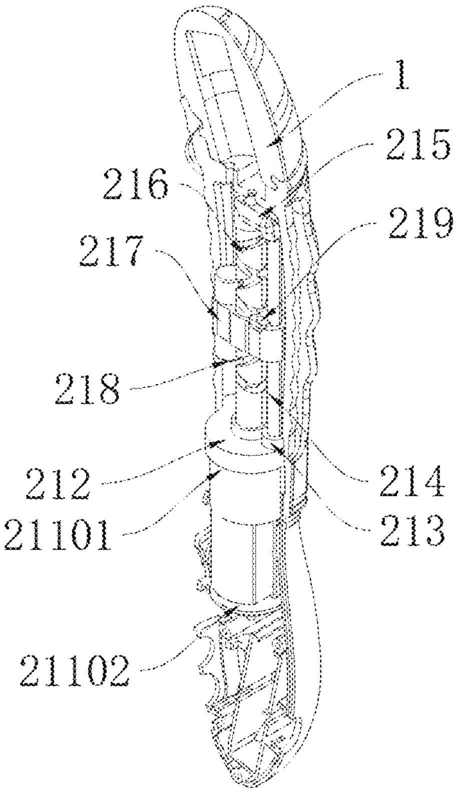
FIG. 4 is a schematic diagram of the fixing base in Embodiment 2 of the invention.
Figure 5:
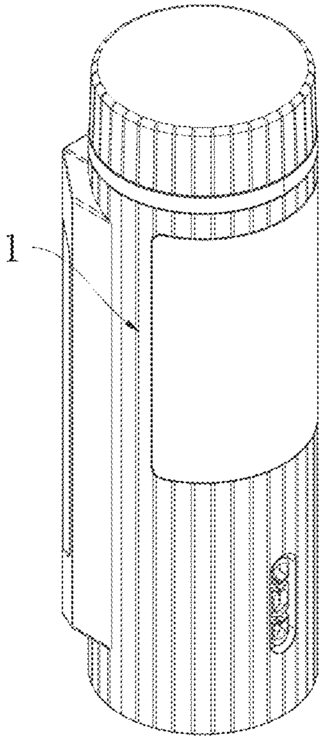
FIG. 5 is a schematic diagram of the right protective cover in Embodiment 3 of the invention.
Figure 6:
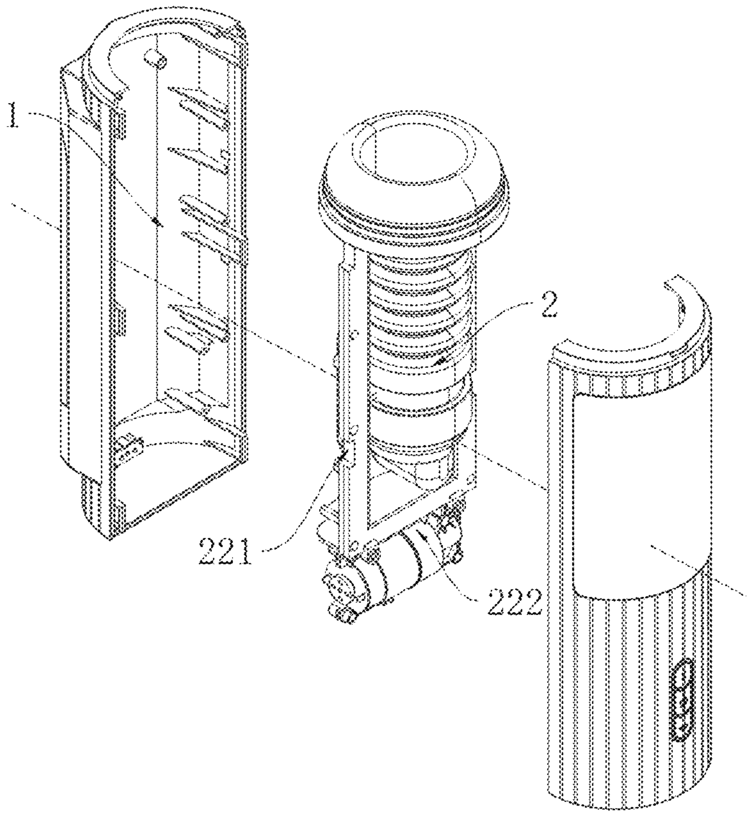
FIG. 6 is a schematic diagram of the bracket in Embodiment 3 of the invention.
Figure 7:
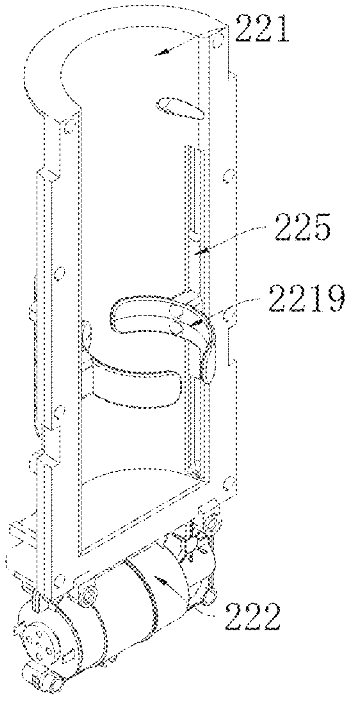
FIG. 7 is a schematic diagram of the left protective cover in Embodiment 3 of the invention.
Figure 8:
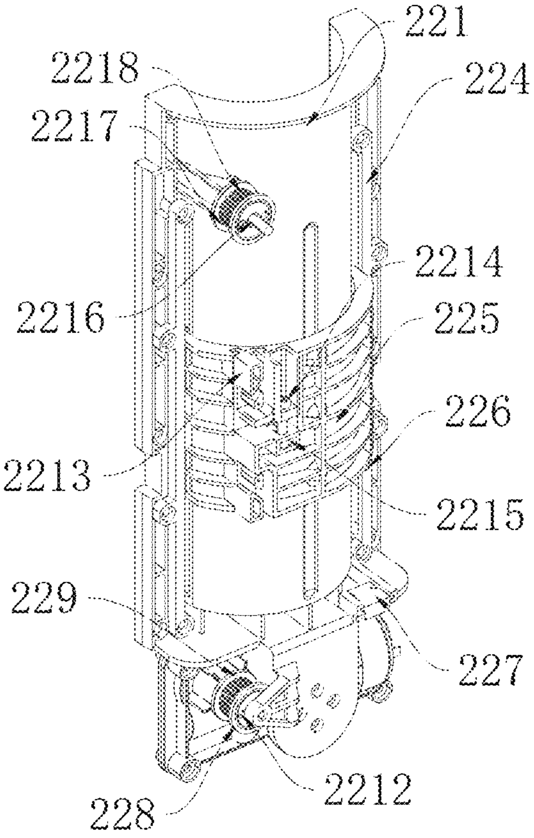
FIG. 8 is a schematic diagram of the first synchronous pulley in Embodiment 3 of the invention.
Figure 9:
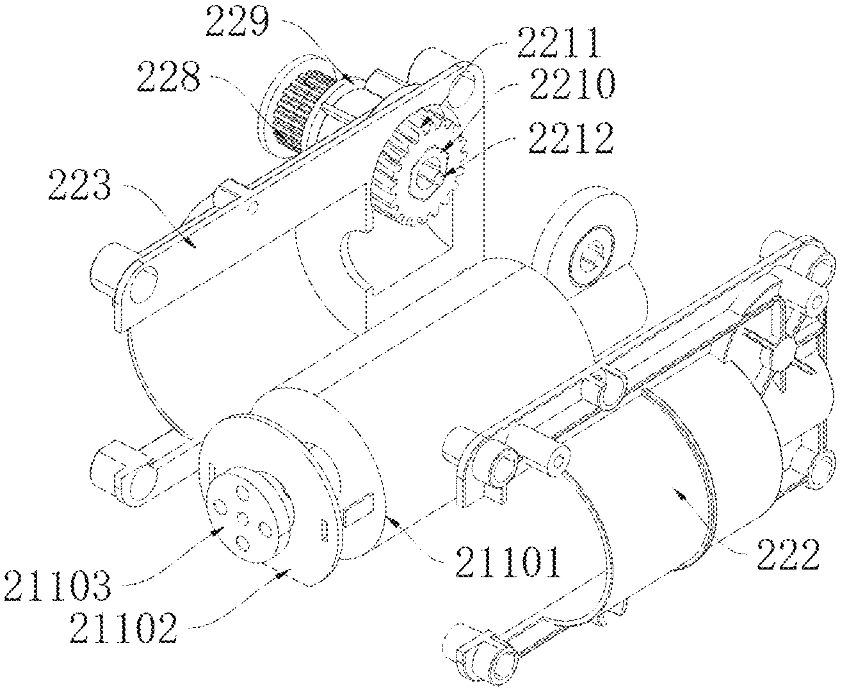
FIG. 9 is a schematic diagram of the bevel gear in Embodiment 3 of the invention.

Please refer to FIG. 1 to FIG. 9. An embodiment of the invention provides a universal reciprocating multi-stage adjustable massager, which includes an outer coating 1. The outer coating 1 not only plays a role in physical protection but also serves as an installation reference; a power mechanism 2 for providing power output and transmission adjustment is installed inside the outer coating 1; the outer coating 1 is made of engineering plastic, and the outer coating 1 here is the shell of the massager.

A drive assembly 211 includes a power motor 21101 for providing power, a Hall encoder 21102 for detecting rotational speed and number of rotation cycles, and a first pole pair magnetic ring 21103 that cooperates with the Hall encoder 21102 to realize signal collection. These three components form a power detection and output unit. The power motor 21101 is a DC gear motor, the Hall encoder 21102 adopts an incremental design, and the first pole pair magnetic ring 21103 has a multi-pole permanent magnet structure, which generates magnetic signals as the motor rotates.

Embodiment 2

Please refer to FIG. 1 to FIG. 4, the drive assembly 211 in Embodiment 1 is applied to a massage stick in Embodiment 2. The power mechanism 2 is composed of the drive assembly 211, a rod base 212, a slider steel shaft 213, a fixed steel shaft 214, a fixing base 215, a reciprocating lead screw 216, a reciprocating slider 217, a vibration motor 218, and a steel shaft fixing part 219;

The drive assembly 211 provides power output, the rod base 212 and the fixing base 215 form a support frame, the slider steel shaft 213 and the fixed steel shaft 214 provide guidance, the reciprocating lead screw 216 and the reciprocating slider 217 are used for transmission, the vibration motor 218 provides vibration, the steel shaft fixing part 219 fixes the fixed steel shaft 214.

Please refer to FIG. 1 to FIG. 4, an exterior of the power motor 21101 is installed inside the outer coating 1 to ensure stability during power output; a bottom of the power motor 21101 is installed on a top side of the Hall encoder 21102, allowing the Hall encoder 21102 to monitor the rotation state of the power motor 21101 in real time; a bottom side of the Hall encoder 21102 is attached to a top side of the first pole pair magnetic ring 21103, and the first pole pair magnetic ring 21103 rotates synchronously with the power motor 21101 to provide stable magnetic signal input for the Hall encoder 21102; a top side of the power motor 21101 is fixedly connected to a bottom side of the rod base 212, which plays a supporting role; the rod base 212 is made of aluminum alloy and is rust-proof, a top side of the rod base 212 is fixedly connected to a bottom side of the fixed steel shaft 214, which provides longitudinal support for the overall structure, a top side of the fixed steel shaft 214 is fixedly connected to a bottom side of the fixing base 215, forming a stable longitudinal support frame; a drive end of the power motor 21101 is fixedly connected to a bottom side of the reciprocating lead screw 216 through a coupling or spline structure to drive the reciprocating lead screw 216 to rotate synchronously; a top end of the reciprocating lead screw 216 is rotatably connected to a preset mounting hole inside the fixing base 215 through a bearing; an interior of the reciprocating slider 217 is fixedly connected to an exterior of the vibration motor 218 to provide support for the reciprocating slider 217; the slider steel shaft 213 transversely penetrates a preset through-hole of the reciprocating slider 217 and is clamped in the steel shaft fixing part 219 to play a role in transverse guidance and limiting, an interior of the reciprocating slider 217 is slidably connected to an exterior of the fixed steel shaft 214 through a linear bearing to ensure the linear accuracy of the reciprocating motion, a bottom end of the reciprocating lead screw 216 is rotatably connected to a preset mounting position inside the rod base 212 through a bearing, forming a rotating support structure.

Specifically, the power motor 21101 drives the reciprocating slider 217 on the reciprocating lead screw 216 to perform precise reciprocating movement. The fixed steel shaft 214 and the slider steel shaft 213 jointly play a role in strengthening and guiding the reciprocating lead screw 216 to ensure the stability and straightness of the reciprocating motion. The motor drives the lead screw through forward and reverse rotation, and the thread fit converts rotation into linear motion; the double steel shafts suppress vibration. After starting, the reciprocating slider 217 moves toward the power motor 21101 and triggers a preset zero-return switch to accurately determine the starting position of the reciprocating motion. The zero-return switch is a micro travel switch, which transmits a signal to the main board after being triggered. Then, the single-chip microcomputer main board collects signals in real time through the Hall encoder 21102 at a rear of the power motor 21101 to calculate the number of pulses output by the power motor 21101 per rotation; the single-chip microcomputer captures the pulses and uses frequency multiplication to improve accuracy. Furthermore, according to the specified position where the reciprocating slider 217 needs to move, the number of rotations required for the power motor 21101 is calculated in reverse, thereby realizing precise positioning of multiple reciprocating stop positions to meet the adjustment needs of different massage positions. The number of rotations is calculated based on the lead of the lead screw, and the motor is controlled by PWM to support multi-stage positioning.

Embodiment 3

Please refer to FIG. 4 to FIG. 9. An embodiment of the invention provides a universal reciprocating multi-stage adjustable massager. The drive assembly 211 in Embodiment 1 is applied to the male masturbator in Embodiment 3, which includes an outer coating 1 and a cover 3 for sealing protection. The outer coating 1 and the cover 3 are connected by threads, and the outer coating 1 here is the shell of the male masturbator. A power mechanism 2 is adaptively arranged inside the outer coating 1; the power mechanism 2 further includes a bracket 221. The cover 3 is equipped with a sealing ring for dust and water prevention, and the bracket 221 integrates installation functions.

The bracket 221 is made of engineering plastic, and its exterior is fixedly connected to a preset mounting surface inside the outer coating 1 through a set of bolts, a bottom of the bracket 221 is fixedly connected with a right protective cover 222 and a left protective cover 223 through screws; the left and right protective covers 222 jointly prevent dust or foreign objects from entering. Both front and rear sides of the bracket 221 are fixedly connected with ball slide rails 224 through bolts; interior of two ball slide rails 224 are slidably connected with three-directional ball sliders 225 through balls; the three-directional ball sliders 225 can perform smooth reciprocating movement along the ball slide rails 224. A second pole pair magnetic ring 226 is installed at a bottom of the three-directional ball slider 225 through adhesion, a Hall zero switch 227 is installed inside the bracket 221 at a position corresponding to the second pole pair magnetic ring 226; the second pole pair magnetic ring 226 cooperates with the Hall zero switch 227 to realize initial position detection. The Hall zero switch 227 is of a unipolar type, and its position can be finely adjusted;

an interior of the bracket 221 is rotatably connected with a first synchronous pulley 228 through a rotating shaft and a bearing; the rotating shaft is made of high-quality steel, the bearing is a miniature deep groove ball bearing, and the first synchronous pulley 228 is made of aluminum alloy; an exterior of the ball slide rail 224 is slidably connected to a preset sliding groove inside the bracket 221 through a clamping groove; a second synchronous idler 2218 is in transmission connection with the first synchronous pulley 228 through a timing belt to realize power transmission and direction change; the timing belt is made of polyurethane and adopts tooth meshing; a right side of the first synchronous pulley 228 is equipped with a second synchronous pulley 229 through a key connection (flat key connection), and the number of teeth of the second synchronous pulley 229 is the same as that of the first synchronous pulley 228; an interior of the second synchronous pulley 229 is fixedly connected with a main drive shaft 2210 through a spline, a first synchronous pulley 228 is arranged at the corresponding position on an exterior of the main drive shaft 2210; a set screw fixes the synchronous pulley to prevent relative rotation; an interior of the main drive shaft 2210 is fixedly connected with a reinforced steel shaft 2212 through an interference fit to enhance the structural strength and torsion resistance of the main drive shaft 2210; the reinforced steel shaft 2212 undergoes quenching and tempering treatment to improve torsion resistance;

The exterior of the main drive shaft 2210 is fixedly connected with a bevel gear 2211 through a key connection; the bevel gear 2211 is used to change the direction of power transmission, and the key connection specifications are consistent, the bevel gear 2211 is used to change the direction of power, a left interior of the three-directional ball slider 225 is detachably connected with a timing belt tensioning slider 2213 through bolts to facilitate later maintenance and tension adjustment; a timing belt tensioning slide rod 2214 is inserted inside the timing belt tensioning slider 2213; an exterior of the timing belt tensioning slide rod 2214 is threadedly connected with a timing belt tensioning nut 2215. The tension of the timing belt can be adjusted by rotating the timing belt tensioning nut 2215 to ensure transmission stability; the interior of the bracket 221 is rotatably connected with an idler reinforced steel shaft 2216 through a bearing; an exterior of the idler reinforced steel shaft 2216 is fixedly connected with a first synchronous idler 2217 through a key connection (matching key connection), and the first synchronous idler 2217 has the same structure as the first synchronous pulley 228; a right side of the first synchronous idler 2217 is fixedly connected with the second synchronous idler 2218 through integral molding or key connection to form an idler group structure; the idler group changes the transmission direction. Both front and rear sides of the interior of the three-directional ball slider 225 are fixedly connected with follow-up clamps 2219 through bolts to fix the timing belt and make the three-directional ball slider 225 move synchronously with the timing belt. The bolts fix the clamps, and inner rubber pads protect the belt. The exterior of the power motor 21101 is fixedly installed inside the installation cavity enclosed by the bracket 221 and the right protective cover 222 through bolts; the bolts fix the motor, and the installation cavity is adapted to the shell. The drive end of the power motor 21101 is in meshing connection with the bevel gear 2211 through a gear meshing structure to realize stable power transmission.

Specifically, a reduction gearbox composed of the power motor 21101 and a reduction structure drives a driving synchronous pulley group (composed of the main drive shaft 2210, the first synchronous pulley 228, and the second synchronous pulley 229) and an idler group (composed of the first synchronous idler 2217 and the second synchronous idler 2218). The three-directional ball slider 225 is dragged to perform stable reciprocating movement through the timing belt. Among them, the ball rolling structure between the ball slide rail 224 and the three-directional ball slider 225 greatly reduces the friction during the reciprocating movement, improves the movement smoothness, and reduces wear.

The principle of multi-stage positioning is as follows: after starting, the power motor 21101 rotates forward to drive the three-directional ball slider 225 to move toward the Hall zero switch 227. When the second pole pair magnetic ring 226 on the three-directional ball slider 225 approaches the Hall zero switch 227, the Hall zero switch 227 triggers a signal. After receiving the signal, the main board determines the initial zero position. Then, the single-chip microcomputer main board collects pulse signals from the Hall encoder 21102 at the rear of the power motor 21101 to calculate the number of pulses output by the power motor 21101 per rotation. Further, according to the specified position where the three-directional ball slider 225 needs to move, the number of rotations required for the power motor 21101 is calculated to accurately control the stop positions of multi-stage positioning, realizing multi-gear and multi-position massage adjustment.

Working Principle:

When the massager needs to be used: after the power motor 21101 is started, its drive end outputs rotational power. First, it drives the first pole pair magnetic ring 21103 to rotate synchronously, providing magnetic signals for the Hall encoder 21102 to realize rotational speed detection. Then, the power is transmitted to the bottom end of the reciprocating lead screw 216 through a coupling or spline structure. The reciprocating lead screw 216 rotates accordingly; since it is in threaded fit with the reciprocating slider 217, and the reciprocating slider 217 is sleeved on the fixed steel shaft 214 through a linear bearing and cannot rotate with the lead screw, the rotational motion of the reciprocating lead screw 216 is converted into the linear reciprocating motion of the reciprocating slider 217 along the fixed steel shaft 214. At the same time, the slider steel shaft 213 penetrates the reciprocating slider 217 and is fixed to the steel shaft fixing part 219, further restricting the radial vibration of the reciprocating slider 217. The vibration motor 218 performs linear reciprocating movement synchronously with the reciprocating slider 217 and starts to generate vibration by itself, finally realizing the massage effect.

When the male masturbator needs to be used: after the power motor 21101 (cooperating with the reduction gearbox) is started, its drive end outputs rotational power. The power is transmitted to the bevel gear 2211 through the meshing of the drive end gear and the bevel gear 2211. Since the bevel gear 2211 is fixedly sleeved on the exterior of the main drive shaft 2210 (a reinforced steel shaft 2212 is inserted inside the main drive shaft 2210 to enhance torsion resistance), the bevel gear 2211 drives the main drive shaft 2210 to rotate synchronously when rotating, completing the conversion of the power transmission direction. During the rotation of the main drive shaft 2210, the second synchronous pulley 229 on its exterior rotates synchronously with the shaft and drives the first synchronous pulley 228 to rotate through key connection. The first synchronous pulley 228 then forms a transmission fit with the second synchronous idler 2218 and the first synchronous idler 2217 fixed on the idler reinforced steel shaft 2216 through the timing belt, forming a closed belt transmission loop. During this period, the timing belt tensioning slider 2213, the timing belt tensioning slide rod 2214, and the timing belt tensioning nut 2215 cooperate to adjust the tension of the timing belt to avoid slipping. The three-directional ball slider 225 is fixed to the timing belt through the follow-up clamp 2219; when the timing belt moves, it drives the three-directional ball slider 225 to perform linear reciprocating movement along the ball slide rail 224 on the bracket 221, realizing the massage effect.

Although the embodiments of the invention have been shown and described, it will be understood by those of ordinary skill in the art that various changes, modifications, substitutions and variations can be made to these embodiments without departing from the principle and spirit of the invention. The scope of the invention is defined by the appended claims and their equivalents.

The invention claimed is:

1. A universal reciprocating multi-stage adjustable massager, including a reciprocating vibration mechanism, which is characterized in that:

the reciprocating vibration mechanism includes a drive assembly, the drive assembly includes a power motor, and the power motor is used to provide a driving source;

the drive assembly further includes a Hall encoder and a first pole pair magnetic ring, a bottom of the power motor is installed on a top side of the Hall encoder;

the vibration mechanism also includes:

a fixing base, a rod base, and a fixed steel shaft; the fixing base is fixedly connected to the rod base through the fixed steel shaft;

a reciprocating lead screw, wherein a drive end of the power motor is fixedly connected to a bottom side of the reciprocating lead screw;

and a reciprocating slider, wherein the reciprocating slider is threadedly connected to an exterior of the reciprocating lead screw, and an interior of the reciprocating slider is slidably connected to an exterior of the fixed steel shaft; a vibration motor is fixedly connected to the interior of the reciprocating slider;

the reciprocating vibration mechanism further includes a slider steel shaft and a steel shaft fixing part; both ends of the slider steel shaft are clamped in the steel shaft fixing part;

the reciprocating vibration mechanism further includes:

a bracket, an exterior of the bracket is fixedly connected to an interior of an outer coating;

a bevel gear, wherein the drive end of the power motor is in meshed connection with the bevel gear;

a main drive shaft, wherein the bevel gear is fixedly connected to an exterior of the main drive shaft;

a first synchronous pulley, wherein the first synchronous pulley is arranged on the exterior of the main drive shaft;

ball slide rails, wherein the ball slide rails are fixedly connected to both front and rear sides of the bracket;

and a three-directional ball slider, wherein the three-directional ball slider is drivingly connected to the first synchronous pulley through a timing belt;

an idler reinforced steel shaft is rotatably connected to an interior of the bracket; a first synchronous idler is fixedly connected to an exterior of the idler reinforced steel shaft; a second synchronous idler is fixedly connected to a right side of the first synchronous idler; a timing belt tensioning slider is detachably connected to a left interior of the three-directional ball slider; a timing belt tensioning slide rod is arranged inside the timing belt tensioning slider; a timing belt tensioning nut is threadedly connected to an exterior of the timing belt tensioning slide rod; follow-up clamps are fixedly connected to both front and rear sides of interior of the three-directional ball slider.

2. The universal reciprocating multi-stage adjustable massager according to claim 1, wherein a power mechanism also includes:

the fixing base, the rod base, and the fixed steel shaft; the fixing base is fixedly connected to the rod base through the fixed steel shaft;

the power motor is fixedly connected to a bottom side of the rod base;

a bottom side of the Hall encoder is mounted on a top side of the first pole pair magnetic ring;

the reciprocating lead screw, wherein the drive end of the power motor is fixedly connected to the bottom side of the reciprocating lead screw, and a top end of the reciprocating lead screw is rotatably connected to an interior of the fixing base;

and the reciprocating slider, wherein the reciprocating slider is threadedly connected to the exterior of the reciprocating lead screw, and the interior of the reciprocating slider is slidably connected to the exterior of the fixed steel shaft.

3. The universal reciprocating multi-stage adjustable massager according to claim 2, wherein the vibration motor is fixedly connected to the interior of the reciprocating slider.

4. The universal reciprocating multi-stage adjustable massager according to claim 2, wherein the power mechanism further includes the slider steel shaft and the steel shaft fixing part; the slider steel shaft is arranged parallel to the fixed steel shaft, penetrates the reciprocating slider, and has both ends clamped in the steel shaft fixing part; a bottom end of the reciprocating lead screw rotates inside the rod base under the drive of the power motor.

5. The universal reciprocating multi-stage adjustable massager according to claim 4, wherein the power mechanism further includes:

the bracket, the exterior of the bracket is fixedly connected to an interior of the outer coating;

the bevel gear, wherein the drive end of the power motor is in meshed connection with the bevel gear;

the main drive shaft, wherein the bevel gear is fixedly connected to the exterior of the main drive shaft;

the first synchronous pulley, wherein the first synchronous pulley is arranged on the exterior of the main drive shaft;

ball slide rails, wherein the ball slide rails are fixedly connected to both front and rear sides of the bracket;

and the three-directional ball slider, wherein the three-directional ball slider is slidably connected to interior of the ball slide rails, and the three-directional ball slider is drivingly connected to the first synchronous pulley through a timing belt.

6. The universal reciprocating multi-stage adjustable massager according to claim 5, wherein the drive assembly further includes the Hall encoder and the first pole pair magnetic ring; a right protective cover and a left protective cover are fixedly connected to a bottom of the bracket; an exterior of the power motor is mounted inside the bracket and the right protective cover.

7. The universal reciprocating multi-stage adjustable massager according to claim 6, wherein a second pole pair magnetic ring is mounted at a bottom of the three-directional ball slider; a Hall zero switch is mounted inside the bracket; a second synchronous pulley is mounted on a right side of the first synchronous pulley; a reinforced steel shaft is fixedly connected to an interior of the main drive shaft.

8. The universal reciprocating multi-stage adjustable massager according to claim 7, wherein the idler reinforced steel shaft is rotatably connected to the interior of the bracket; the first synchronous idler is fixedly connected to the exterior of the idler reinforced steel shaft; the second synchronous idler is fixedly connected to the right side of the first synchronous idler.

9. The universal reciprocating multi-stage adjustable massager according to claim 8, wherein the timing belt tensioning slider is detachably connected to the left interior of the three-directional ball slider; the timing belt tensioning slide rod is arranged inside the timing belt tensioning slider.

10. The universal reciprocating multi-stage adjustable massager according to claim 9, wherein a timing belt tensioning nut is threadedly connected to the exterior of the timing belt tensioning slide rod; follow-up clamps are fixedly connected to both front and rear sides of the interior of the three-directional ball slider.

* * * * *